(No Model.)

J. M. WALDEN.
COTTON CHOPPER.

No. 255,058. Patented Mar. 14, 1882.

WITNESSES:
Francis McArdle
C. Sedgwick

INVENTOR:
J. M. Walden
BY Munn & Co.
ATTORNEYS.

UNITED STATES PATENT OFFICE.

JOHN M. WALDEN, OF FORT VALLEY, GEORGIA.

COTTON-CHOPPER.

SPECIFICATION forming part of Letters Patent No. 255,058, dated March 14, 1882.

Application filed December 19, 1881. (No model.)

*To all whom it may concern:*

Be it known that I, JOHN M. WALDEN, of Fort Valley, in the county of Houston and State of Georgia, have invented certain new and useful Improvements in Cotton-Choppers, of which the following is a full, clear, and exact specification.

Reference is to be had to the accompanying drawings, forming part of this specification, in which similar letters of reference indicate corresponding parts in all the figures.

Figure 1:
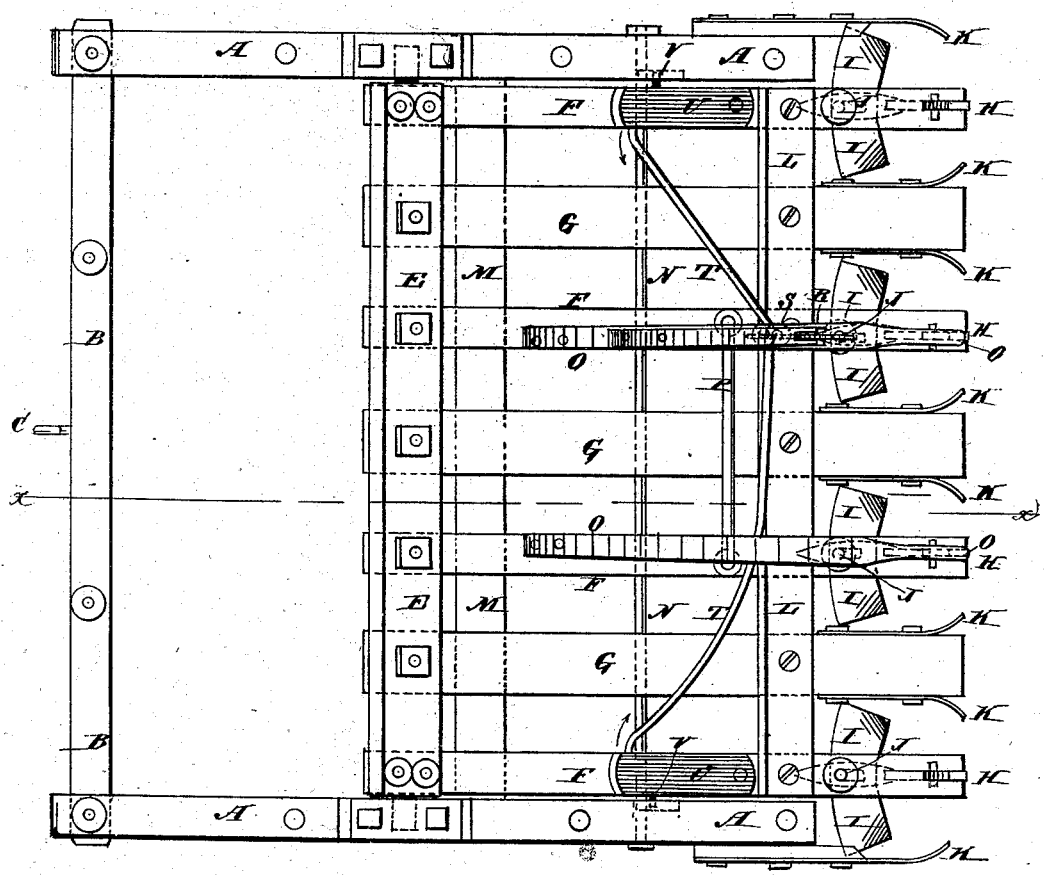
Figure 2:
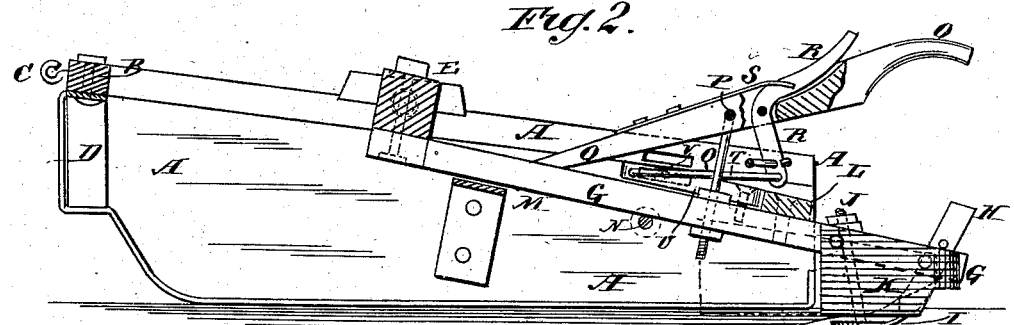
Figure 3:
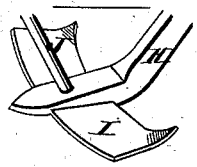

Figure 1 is a plan view of my improvement. Fig. 2 is a sectional side elevation of the same. Fig. 3 is a perspective view of a chopping-hoe and the lower parts of its standard and fastening-rod.

This invention relates to that kind of cotton-choppers that chop the cotton by being drawn across the rows, and has for its object to promote convenience in guiding and controlling the machine, and to secure a uniform stand.

The invention consists in the combination, with the runners and the rock-shaft, of the beams carrying chopping-hoes and alternating beams carrying guard-plates, whereby the plants are chopped to a stand, and the plants left for a stand are protected from injury; also, in the combination, with the runners, the rock-shaft, and the intermediate beams, of guard-plates, whereby the crust of the soil is cut at the opposite sides of the plants left for a stand, and the said plants are protected from the soil moved by the chopping-hoes; and also in the combination, with the handles, the side beams, and the runners, of a spring-pressed bent lever, rods connected with the lever, and hinged latches connected with the rods and provided with catch-pins, whereby the beams can be locked in place, and unlocked, as will be hereinafter fully described.

A are the side bars of the chopper, which serve as runners to carry the operating parts of the machine, and which are made deeper toward their forward ends to give a rearward and downward inclination to their upper edges. The lower edges of the runners A are faced with metal to prevent wear. The forward ends of the runners A are connected by a cross-bar, B, to the center of which is attached an eye-bolt, hook, or staple, C, for the attachment of the draft. The connection between the runners A and the cross-bar B is strengthened by braces D.

In bearings attached to the upper edges of the runners A, at a little distance from their forward ends, work the journals of the shaft E, to which are bolted the forward ends of the bars or beams F G, which alternate with each other, as shown in Fig. 1.

In mortises in the rear ends of the beams F are secured the upper ends of the standards H, the lower ends of which are bent forward into horizontal positions, and have cross-grooves formed in their lower sides to receive the chopping-hoes I. The forward or cutting edges of the chopping-hoes I are curved, as shown in Figs. 1 and 3, and their rear corners are curved upward slightly, so as to have a tendency to throw the soil and plants toward the middle part of the guards, and the guards being curved at their rear ends throw the excess of soil and the rubbish into the cuts and away from the plants left for a stand. The hoes I are secured in place upon the feet of the standards H by the rods J, which pass through the hoes I, standards H, and beams F, and have nuts screwed upon their upper ends, so that the said rods will also serve as braces to strengthen the said standards against the draft-strain.

To the opposite sides of the rear ends of the alternating beams G are attached the plates K, which project below the said beams G to cut the soil at the sides of the plants left for a stand to prevent the said plants from being injured by the action of the hoes I. The plates K also act as fenders, to prevent the plants left for a stand from being injured by soil or plants moved by the said hoes I. The rear ends of the plates K are slightly curved outward or from the beams G to guide the soil and plants moved by the chopping-hoes I away from the plants left for a stand and toward the centers of the cuts made by the hoes I. Plates K are also attached to the outer sides of the rear ends of the runners A or to bars attached to the said runners. The beams F G are kept in their proper relative position by a cross-bar, L, attached to their upper sides at a little distance from their rear ends. The runners A are connected and held in their proper positions, and the beams F G are kept from dropping down too far by a cross-bar, M, and rod N, attached to the said runners in such positions as to be below the said beams. The machine is guided and the beams F G are controlled by the handles O, the forward ends of which are attached to the beams F upon the opposite sides of the center beam, G. The handles O are connected by a round, P, and the connection between the said handles O and beams F is strengthened by the braces Q, attached to the said beams and handles.

In a slot in one of the handles O is pivoted a bent lever, R, at its bend or angle. The bent lever R is kept in proper position by a spring, S, attached to the said handle O, and bearing upon the upper arm of the said bent lever R.

To the lower end of the bent lever R are hinged the ends of two rods, T, the other ends of which are attached to the forward ends of the latches or catch-bars U, which are placed upon the side beams, F, at the inner sides of the upper parts of the runners A, and are pivoted to the said side beams, F.

To the outer sides of the forward ends of the latches U are attached pins V, the projecting ends of which enter holes or recesses in the inner sides of the upper parts of the runners A, to lock the beams F G in position. Two or more holes are formed in the runners A to receive the pins V, so that the beams F G can be adjusted with the chopping-hoes I in working position, or raised above the ground for convenience in taking the machine from place to place.

With this construction the latches U can be withdrawn from the runners A by operating the lever R, leaving the beams F G free to be adjusted by means of the handles O.

With this construction, by detaching the plates K from all the beams except the center one, replacing the chopping-hoes by shovel-plows, and attaching shovel-plows to all the beams G except the center one, the machine can be used as a cultivator and drawn along the rows to cultivate the plants.

Having thus fully described my invention, I claim as new and desire to secure by Letters Patent—

1. In a cotton-chopper, the combination, with the runners A and the rock-shaft E, of the beams F, carrying the chopping-hoes H I J, and alternating beams G, carrying the guard-plates K, substantially as herein shown and described, whereby the plants are chopped to a stand and the plants left for a stand are protected from injury, as set forth.

2. In a cotton-chopper, the combination, with the runners A, the rock-shaft E, and the intermediate beams, G, of the plates K, substantially as herein shown and described, whereby the crust of the soil is cut at the opposite sides of the plants left for a stand and the said plants protected from the soil moved by the chopping-hoes, as set forth.

3. In a cotton-chopper, the combination, with the handles O, the side beams, F, and the runners A, of the bent lever R, the spring S, the rods T, and the latches U, having pins V, substantially as herein shown and described, whereby the beams can be locked in place and unlocked, as set forth.

JOHN MILLEDGE WALDEN.

Witnesses:
  JNO. DILL MARSHALL,
  GEORGE WASHINGTON MADDOX.